United States Patent
Sun et al.

(10) Patent No.: US 9,036,484 B2
(45) Date of Patent: May 19, 2015

(54) METHOD FOR TRANSMITTING MBSFN SUBFRAME CONFIGURATION INFORMATION OF NEIGHBORING CELLS

(75) Inventors: Chengjun Sun, Beijing (CN); Xiaoqiang Li, Beijing (CN); Himke Van Der Velde, Zwolle (NL); Kyeong In Jeong, Hwasong-si (KR); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 13/148,801

(22) PCT Filed: Feb. 9, 2010

(86) PCT No.: PCT/KR2010/000776
§ 371 (c)(1),
(2), (4) Date: Nov. 9, 2011

(87) PCT Pub. No.: WO2010/093156
PCT Pub. Date: Aug. 19, 2010

(65) Prior Publication Data
US 2012/0099434 A1    Apr. 26, 2012

(30) Foreign Application Priority Data

Feb. 10, 2009 (CN) .......................... 2009 1 0005875
Feb. 11, 2009 (CN) .......................... 2009 1 0004211

(51) Int. Cl.
G01R 31/08 (2006.01)
G06F 11/10 (2006.01)
G08C 15/00 (2006.01)
H04J 1/16 (2006.01)
H04J 3/14 (2006.01)
H04L 1/00 (2006.01)
(Continued)

(52) U.S. Cl.
CPC .............. *H04W 24/10* (2013.01); *H04W 48/12* (2013.01); *H04W 72/005* (2013.01)

(58) Field of Classification Search
USPC .......................................................... 370/241
See application file for complete search history.

(56) References Cited

U.S. PATENT DOCUMENTS 6,640,102 B2   10/2003   Frodigh et al.
6,654,609 B2   11/2003   Kim
(Continued)

OTHER PUBLICATIONS

3GPP TS 36.331 V8.4.0 (Dec. 2008) 3rd Generation Partnership Project; Technical Specification Group Radio Access Network; Evolved Universal Terrestrial Radio Access (E-UTRA) Radio Resource Control (RRC); Protocol specification (Release 8).*

*Primary Examiner* — Brian Roberts
*Assistant Examiner* — Shah R Zaman
(74) *Attorney, Agent, or Firm* — Jefferson IP Law, LLP

(57) ABSTRACT

Disclosed is a method for transmitting MBSFN subframe configuration information of neighboring cells in a wireless system, the method comprises steps of: transmitting, by a base station of a serving cell, MBSFN subframe configuration information of the serving cell to a UE which accepts services from the serving cell via a broadcast control channel (BCCH); transmitting, by the base station of the serving cell, information on a subset relationship of MBSFN subframe configurations of the neighboring cells relative to the MBSFN subframe configuration of the serving cell to the UE which accepts services from the serving cell via the broadcast control channel (BCCH); performing, by the UE, measurements on the neighboring cells according to the subframe configuration information of the serving cell and the information on the subset relationship of the MBSFN subframe configurations of the neighboring cells relative to the MBSFN subframe configuration of the serving cell. With the method of the present invention, the UE can learn about the MBSFN subframe configuration information of the neighboring cells in a more accurately manner. Therefore, more subframes can be measured to improve measurement precision. Meanwhile, the present invention is based on redefinition of messages in the existing method, and thus no extra signaling overhead will be introduced.

21 Claims, 2 Drawing Sheets

(51) Int. Cl.
*H04L 12/26* (2006.01)
*H04W 24/10* (2009.01)
*H04W 48/12* (2009.01)
*H04W 72/00* (2009.01)

(56) References Cited

U.S. PATENT DOCUMENTS

| | | |
|---|---|---|
| 7,363,038 B2 | 4/2008 | Kim et al. |
| 7,369,853 B2 | 5/2008 | Son et al. |
| 8,401,575 B2 * | 3/2013 | Fischer et al. ................ 455/466 |
| 2001/0001762 A1 * | 5/2001 | Frodigh et al. ................ 455/436 |
| 2004/0185852 A1 * | 9/2004 | Son et al. ...................... 455/438 |
| 2008/0293376 A1 * | 11/2008 | Suh et al. ...................... 455/410 |
| 2008/0311926 A1 * | 12/2008 | Fischer et al. ............. 455/452.1 |
| 2009/0175179 A1 * | 7/2009 | Stewart et al. ................ 370/252 |
| 2010/0195582 A1 * | 8/2010 | Koskinen ...................... 370/329 |
| 2011/0216842 A1 * | 9/2011 | Zhang et al. .................. 375/260 |

* cited by examiner

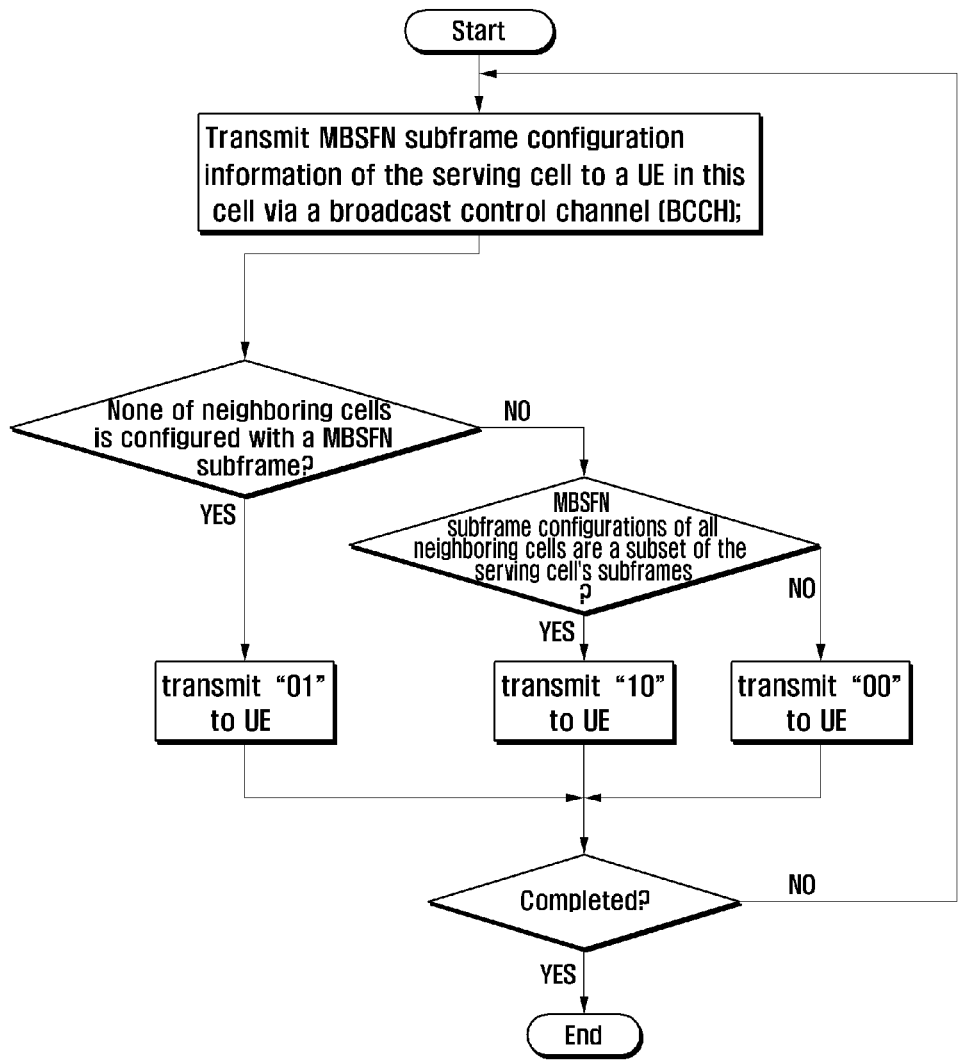

METHOD FOR TRANSMITTING MBSFN SUBFRAME CONFIGURATION INFORMATION OF NEIGHBORING CELLS

TECHNICAL FIELD

The present invention relates to wireless communication system, in particular to a method for indicating MBSFN subframe configuration information of neighboring cells and completing signal power measurements on the neighboring cells in a wireless communication system.

BACKGROUND ART

At present, many advanced and matured techniques, like OFDM modulation and MIMO antenna, are applied in wireless technology development. With the incoming completion of standardization of these new wireless techniques, the performance of a wireless network in terms of throughput and delay has been greatly improved. In a new wireless system, the LTE (Long Term Evolution) network technique is a representative wireless technique based on OFDM and MIMO. It is currently supported by many operators and providers.

An LTE system supports Multi-cast data transmission in addition to the conventional Uni-cast data transmission. Specifically, FIG. 1 shows the composition of an LTE physical-layer frame. In an LTE system, a 10 ms-long transmission frame 101 is divided into 10 subframes 102 at an interval of 1 ms. Here, some of the subframes can be defined by the system as subframes for Multi-cast transmission. In the subframes supporting Multi-cast transmission, Uni-cast data can be mixed and transmitted in a specified format with TDM multiplexing.

In an OFDM system, when all cells share a single frequency for transmission, in the edge of each cell, signal enhancement can be gained with subframes in Multi-cast transmission for the same transmission content. Therefore, a system in which multimedia broadcast information is transmitted in Multi-cast service and the cells share a single frequency for transmission is called MBSFN (Multimedia Broadcast Single-frequency network).

In the MBSFN, a user equipment (UE) can obtain MBSFN configuration information of a cell where the UE is located, i.e., specific subframe information on configuration of data transmission in MBSFN mode (subframe number), by reading a broadcast control channel (BCCH). With the system information transmitted via the BCCH, UE can also obtain the MBSFN information on neighboring cells relative to the serving cell. At present, the LTE standard specification has already supported such broadcast of the neighboring cell MBSFN configuration information. In the broadcast information, however, some problem exists in message definition, which tends to make the UE unable to accurately learn about MBSFN configurations of the neighboring cells, and thus unable to accurately obtain a strategy for measuring the signals from the neighboring cells . The present invention is made in view of the above problem.

The LTE system is divided into two types of Frame type 1 (FDD) and Frame type 2 (TDD) according to the schemes of TDD and FDD. For these two frames structures, SCH (synchronization channel) is transmitted via the zeroth and the fifth subframes in Frame Type 1, and the SCH is transmitted via the first and the sixth subframes in Frame Type 2. If the MBSFN information of one of the neighboring cells can not be correctly transmitted to the UE in the serving cell, the UE is likely to assume all of the subframes, except the one for SCH transmission, are MBSFN subframes in the neighboring cell. Therefore, the UE can perform signal strength measurement only on the subframes for SCH transmission, which results in a degradation of the performance of signal strength measurement for the neighboring cell The present invention can avoid the above disadvantage by perfecting message definition in the current standard.

DISCLOSURE OF INVENTION

Technical Problem

An object of the present invention is to provide a method for indicating MBSFN subframe configuration information of neighboring cells and thus optimizing measurement on the neighboring cells.

Solution to Problem

To achieve the object mentioned above, a method for transmitting, by a base station, MBSFN subframe configuration information of neighboring cells comprises steps of:

transmitting, by a base station of a serving cell, MBSFN subframe configuration information of the serving cell to a UE which accepts services from the serving cell via a broadcast control channel (BCCH);

transmitting, by the base station of the serving cell, information on a subset relationship of MBSFN subframe configurations of the neighboring cells relative to the MBSFN subframe configuration of the serving cell to the UE which accepts services from the serving cell via the broadcast control channel (BCCH);

performing, by the UE, measurements on the neighboring cells according to the subframe configuration information of the serving cell and the information on the subset relationship of the MBSFN subframe configurations of the neighboring cells relative to the MBSFN subframe configuration of the serving cell.

Advantageous Effects of Invention

With the method of the present invention, the UE can learn about the MBSFN subframe configuration information of the neighboring cells in a more accurately manner. Therefore, more subframes can be measured to improve measurement accuracy. Meanwhile, the present invention is based on redefinition of messages in the existing method, and thus no extra signaling overhead will be introduced.

BRIEF DESCRIPTION OF DRAWINGS

FIG. 3 shows a process that the BS of the serving cell transmits the MBSFN subframe configuration information of the neighboring cells to the UE in the first embodiment.

MODE FOR THE INVENTION

In the following, detailed descriptions of well-known functions or equipments are omitted, to avoid any redundancy.

Figure 1:
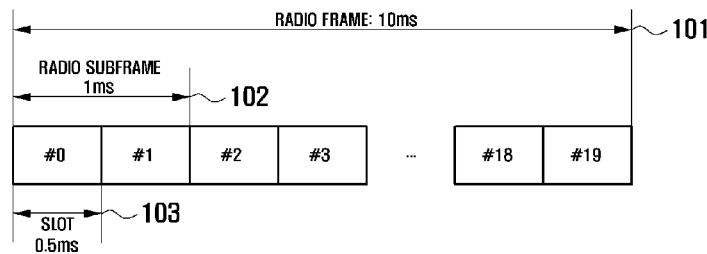
FIG. 1 shows the basic frame structure of the LTE system.
Figure 2:
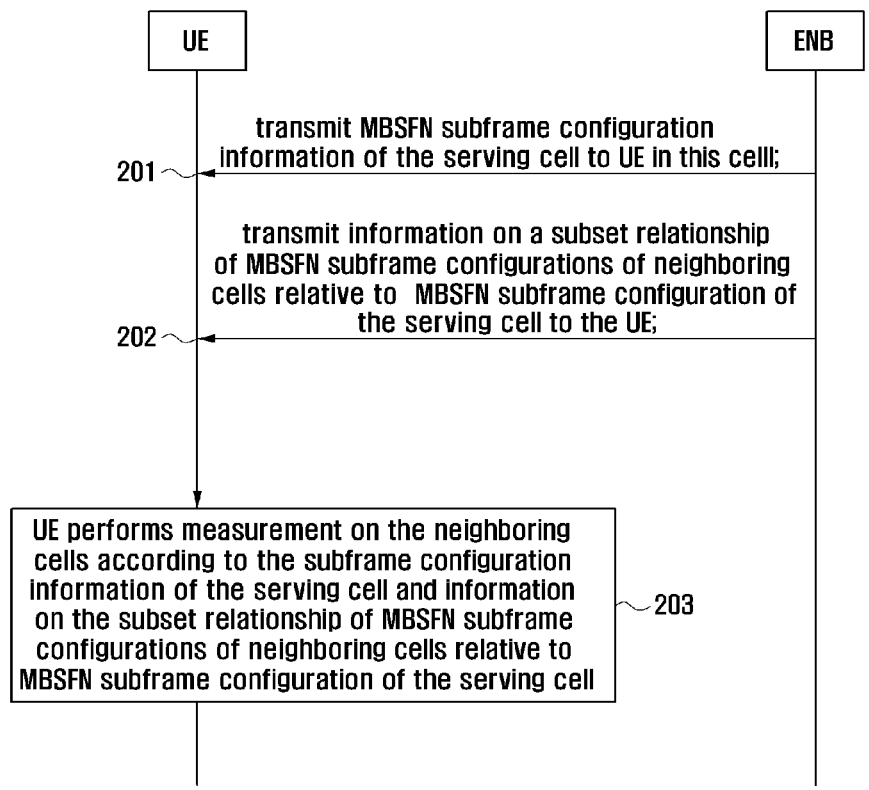
FIG. 2 shows a method for transmitting, by BS, MBSFN subframe configuration information of neighboring cells to a UE according to a first embodiment.

Now, the present invention is described with reference to FIG. 2.

At Step 201, a BS of the serving cell transmits the MBSFN subframe configuration information of the serving cell to a UE in the serving cell via a broadcast control channel (BCCH).

At Step 202, the BS of the serving cell transmits to the UE information on a subset relationship of the MBSFN subframe configurations of neighboring cells relative to the MBSFN subframe configuration of the serving cell to the UE in the serving cell.

The above information on the subset relationship of the MBSFN subframe configurations of the neighboring cells relative to the MBSFN subframe configuration of the serving cell can be transmitted to the UE with Radio Resource Control signaling (RRC signaling) or via the broadcast control channel (BCCH).

According to one implementation of the present embodiment, the information on the subset relationship of the MBSFN subframe configurations of the neighboring cells relative to the MBSFN subframe configuration of the serving cell is illustrated in Table 1 as follows.

Table 1: Information on the subset relationship of the MBSFN subframe configurations of the neighboring cells relative to the MBSFN subframe configuration of the serving cell transmitted from the serving cell to the UE

TABLE 1

Description of subframe configuration information of neighboring cells

Subframe configurations of neighboring cells:
to provide MBSFN subframe configuration information of intra-frequency neighboring cells:
00: MBSFN subframe configurations of some of the neighboring cells are not a subset of the subframe configuration of the serving cell;
10: MBSFN subframe configurations of all the neighboring cells are subsets of the subframe configuration of the serving cell;
01: No MBSFN subframes are present in all neighbour cells.

According to a further implementation of the present embodiment, the information on the subset relationship of the MBSFN subframe configurations of the neighboring cells relative to the MBSFN subframe configuration of the serving cell is illustrated in Table 2 as follows.

Table 2: Information on the subset relationship of the MBSFN subframe configurations of the neighboring cells relative to the MBSFN subframe configuration of the serving cell transmitted from the serving cell to the UE

TABLE 2

Description of subframe configuration information of neighboring cells

Subframe configurations of neighboring cells:
to provide MBSFN subframe configuration information of inter-frequency neighboring cells:
00: MBSFN subframe configurations of some of the neighboring cells are not a subset of the subframe configuration of the serving cell;
10: MBSFN subframe configurations of all the neighboring cells are subsets of the subframe configuration of the serving cell;
01: No MBSFN subframes are present in all neighbour cells.

According to still a further implementation of the present embodiment, the information on the subset relationship of the MBSFN subframe configurations of the neighboring cells relative to the MBSFN subframe configuration of the serving cell is illustrated in Table 3 as follows.

Table 3: Information on the subset relationship of the MBSFN subframe configurations of the neighboring cells relative to the MBSFN subframe configuration of the serving cell transmitted from the serving cell to the UE

TABLE 3

Description of subframe configuration information of neighboring cells

Subframe configurations of neighboring cells:
to provide MBSFN subframe configuration information of intra-frequency neighboring cells and inter-frequency neighboring cells:
00: MBSFN subframe configurations of some of the neighboring cells are not a subset of the subframe configuration of the serving cell;
10: MBSFN subframe configurations of all the neighboring cells are subsets of the subframe configuration of the serving cell;
01: No MBSFN subframes are present in all neighbour cells.

With the above description of subframe configuration information of neighboring cells, if "no MBSFN subframes are present in all neighbour cells", the BS of the serving cell transmits "01" to the UE; if "MBSFN subframe configurations of all the neighboring cells are subsets of the subframe configuration of the serving cell", the BS of the serving cell transmits "10" to the UE; and if "MBSFN subframe configurations of some of the neighboring cells are not a subset of the subframe configuration of the serving cell", the BS of the serving cell transmits "00" to the UE.

At Step 203, according to the subframe configuration information of the serving cell and the information on the subset relationship of the MBSFN subframe configurations of the neighboring cells relative to the subframe configuration of the serving cell, the UE implements respective measurements on the neighboring cells.

For an LTE Frame Type 1 system, if information on the subset relationship of the MBSFN subframe configurations of the neighboring cells relative to the MBSFN subframe configuration of the serving cell received by the UE from the BS of the serving cell is "00", the UE performs measurement on only the subframe #0 or the subframe #5 of the respective neighboring cell; if the subset relationship information is indicated as "10", the UE performs measurement on the subframes of the neighboring cell that are the same as the measurement subframes of the serving cell; and if the subset relationship information is indicated as "01", the UE can performs measurement on all subframes of the neighboring cell.

In the present embodiment, the process that the BS of the serving cell transmits the MBSFN subframe configuration information of the neighboring cells to the UE is illustrated in FIG. 3.

As shown in FIG. 3, the MBSFN subframe configuration information of the neighboring cells is transmitted to the UE via the broadcast control channel (BCCH). If none of the neighboring cells is configured with a MBSFN subframe, "01" is transmitted to the UE; if MBSFN subframe configurations of all the neighboring cells are a subset of the subframe configuration of the serving cell, "10" is transmitted to the UE; otherwise, "00" is transmitted to the UE.

The invention claimed is:
1. A method in a base station of a serving cell for transmitting Multimedia Broadcast Single-Frequency Network (MBSFN) subframe configuration information of neighboring cells, comprising:
transmitting first information associated with a MBSFN subframe configuration of the serving cell to a User Equipment (UE) in the serving cell;
transmitting second information including a first value if no MBSFN subframes are present in the all neighboring cells, a second value if MBSFN subframe configurations of all the neighboring cells are subsets of the subframe configuration of the serving cell, and a third value if

MBSFN subframe configurations of some of the neighboring cells are not a subset of the subframe configuration of the serving cell; and receiving measurement information of the neighboring cells from the UE, wherein subframes associated with the measurement information are determined based on the second information, wherein, if the second information includes the first value, the subframes associated with the measurement information are preset subframes, wherein, if the second information includes the second value, the subframes associated with the measurement information are subframes of the neighboring cells that are the same as the measurement subframes of the serving cell, and wherein, if the second information includes the third value, the subframes associated with the measurement information are all subframes of the neighboring cells.

2. The method of claim 1, wherein the neighboring cells are intra-frequency neighboring cells.

3. The method of claim 1, wherein the neighboring cells are inter-frequency neighboring cells.

4. The method of claim 1, wherein the neighboring cells comprise intra-frequency neighboring cells and inter-frequency neighboring cells.

5. The method of claim 1, wherein the second information is transmitted via a broadcast control channel.

6. The method of claim 1, wherein the second information is transmitted to the UE via a dedicated control channel by means of Radio Resource Control signaling.

7. The method of claim 1, wherein a subframe of the neighboring cells being measured by the UE is determined based on the first information and the second information.

8. The method of claim 1, wherein the each value included in the second information is bit information.

9. The method of claim 1, further comprising:
receiving, from the UE, a signal power measurement on the neighboring cells, according to the first information and the second information.

10. A base station of a serving cell, the base station comprising:
a transceiver configured to transmit and receive a signal; and
a controller configured:
to transmit first information associated with a Multimedia Broadcast Single-Frequency Network (MBSFN) subframe configuration of the serving cell to a User Equipment (UE) in the serving cell,
to transmit second information including a first value if no MBSFN subframes are present in the all neighboring cells, a second value if MBSFN subframe configurations of all the neighboring cells are subsets of the subframe configuration of the serving cell, and a third value if MBSFN subframe configurations of some of the neighboring cells are not a subset of the subframe configuration of the serving cell, and
to receive measurement information of the neighboring cells from the UE,
wherein subframes associated with the measurement information are determined based on the second information,
wherein, if the second information includes the first value, the subframes associated with the measurement information are preset subframes,
wherein, if the second information includes the second value, the subframes associated with the measurement information are subframes of the neighboring cells that are the same as the measurement subframes of the serving cell, and
wherein, if the second information includes the third value, the subframes associated with the measurement information are all subframes of the neighboring cells.

11. A method in a User Equipment (UE) for measuring signal strength of the neighboring cells, the method comprising:
receiving, from a base station of the serving cell, first information associated with a Multimedia Broadcast Single-frequency Network (MBSFN) subframe configuration of the serving cell;
receiving, from the base station of the serving cell, second information including a first value if no MBSFN subframes are present in the all neighboring cells, a second value if MBSFN subframe configurations of all the neighboring cells are subsets of the subframe configuration of the serving cell, and a third value if MBSFN subframe configurations of some of the neighboring cells are not a subset of the subframe configuration of the serving cell; and
measuring subframes associated with the neighboring cells,
wherein, if the second information includes the first value, the subframes associated with the neighboring cells are preset subframes,
wherein, if the second information includes the second value, the subframes associated with the neighboring cells are same as the measurement subframes of the serving cell, and
wherein, if the second information includes the third value, the subframes associated with the neighboring cells are all subframes of the neighboring cells.

12. The method of claim 11, wherein the each value included in the second information is bit information.

13. The method of claim 11, further comprising transmitting the measured signal strengths of the neighboring cells to the base station of the serving cell.

14. The method of claim 11, wherein the neighboring cells are intra-frequency neighboring cells.

15. The method of claim 11, wherein the neighboring cells are inter-frequency neighboring cells.

16. The method of claim 11, wherein the neighboring cells comprise intra-frequency neighboring cells and inter-frequency neighboring cells.

17. The method of claim 11, wherein the second information is received via a broadcast control channel.

18. The method of claim 11, wherein the second information is received from the base station of the serving cell via a dedicated control channel by means of Radio Resource Control signaling.

19. A User Equipment (UE) comprising:
a transceiver configured to transmit and receive signals; and
a controller configured:
to receive, from a base station of the serving cell, first information associated with a Multimedia Broadcast Single-frequency Network (MBSFN) subframe configuration of the serving cell,
to receive, from the base station of the serving cell, second information including a first value if no MBSFN subframes are present in the all neighboring cells, a second value if MBSFN subframe configurations of all the neighboring cells are subsets of the subframe configuration of the serving cell, and a third value if MBSFN subframe configurations of some of the neighboring cells are not a subset of the subframe configuration of the serving cell, to measure signal strengths of the neighboring cells, and to measure subframes associated with the neighboring cells, wherein, if the second information includes the first value, the subframes associated with the neighboring cells are preset subframes, wherein, if the second information includes the second value, the subframes associated with the neighboring cells are same as the measurement subframes of the serving cell, and wherein, if the second information includes the third value, the subframes associated with the neighboring cells are all subframes of the neighboring cells.

20. The base station of claim 10, wherein the each value included in the second information is bit information.

21. The UE of claim 19, wherein the each value included in the second information is bit information.

* * * * *